(12) United States Patent
Kim

(10) Patent No.: US 8,352,314 B2
(45) Date of Patent: Jan. 8, 2013

(54) METHOD AND SYSTEM FOR PROVIDING INTERNET ADVERTISEMENT

(75) Inventor: Yeunsoo Kim, Seoul (KR)

(73) Assignee: DNASOFT CO., Ltd., Seoul (KR)

( * ) Notice: Subject to any disclaimer, the term of this patent is extended or adjusted under 35 U.S.C. 154(b) by 478 days.

(21) Appl. No.: 12/728,741

(22) Filed: Mar. 22, 2010

(65) Prior Publication Data
US 2010/0241506 A1 Sep. 23, 2010

(30) Foreign Application Priority Data

Mar. 20, 2009 (KR) ........................ 10-2009-0024179

(51) Int. Cl.
*G06Q 30/00* (2012.01)
(52) U.S. Cl. ..................................... 705/14.1
(58) Field of Classification Search .................. 705/14.1
See application file for complete search history.

(56) References Cited

U.S. PATENT DOCUMENTS 7,668,950 B2 * 2/2010 Horowitz et al. ............. 709/223

* cited by examiner

*Primary Examiner* — Daniel Lastra
(74) *Attorney, Agent, or Firm* — Kile Park Goekjian Reed & McManus PLLC

(57) ABSTRACT

Provided is a method for providing Internet advertisement. The method provides a plurality of individual Internet advertisements included in an advertisement pool which is configured with a plurality of advertisement groups '$G_1$' to '$G_m$' having a predetermined advertisement number rate '$N_i$', a predetermined exposure frequency setting value '$C_i$' and a correction coefficient '$K_i$'. An advertisement providing server, which provides one or more Internet advertisements to a web page providing server providing a web page including an Internet advertisement, calculates a CTR to the number of times the individual Internet advertisements are exposed.

23 Claims, 5 Drawing Sheets

METHOD AND SYSTEM FOR PROVIDING INTERNET ADVERTISEMENT

CROSS-REFERENCE TO RELATED APPLICATIONS

This application claims priority under 35 U.S.C. §119 to Korean Patent Application No. 10-2009-0024179, filed on Mar. 20, 2009, the disclosure of which is incorporated herein by reference in its entirety.

TECHNICAL FIELD

The present invention relates to a method and system for providing Internet advertisement, and in particular, to a method and system for providing Internet advertisement, which enable all advertisers to obtain the maximum advertisement effects by determining the frequency of exposure to Internet advertisements with a Click Through Rate (CTR) in selectively placing an individual Internet advertisement belonging to a plurality of advertisement groups in a specific advertisement region on a web page.

BACKGROUND

As an Internet advertisement method, a Uniform Resource Locator (URL) link scheme is mainly being used. An Internet advertisement based on the URL link scheme is an advertisement method that inserts Internet advertisements (hereinafter referred to as banner advertisements, which have types such as text character strings, banners and moving images), where a URL link is set, in a web page having many users' accesses, and achieves advertisement effects by moving to an advertisement web page associated with a corresponding advertisement on the basis of the link information when a user accesses a corresponding web page and clicks the Internet advertisement.

Accordingly, the Internet advertisement based on the URL link scheme cannot achieve advertisement effects by only exposing the banner advertisement in a specific web page, and can obtain desired advertisement effects only when a user clicks the banner advertisement. That is, as the number of click times for a banner advertisement exposed in a specific web page becomes higher, i.e., as a CTR becomes higher, the Internet advertisement based on the URL link scheme can obtain a high advertisement effect.

FIG. 1 is an exemplary diagram illustrating the web page of a portal site in which an Internet advertisement is inserted.

Referring to FIG. 1, a web page provided from a portal site provides contents such as news articles, and allocates a specific region as an advertisement region 100 to provide all types of advertisements (for example, text character strings, banners and moving images).

In such advertisements, different advertisements may be provided with time or according to the web-page accesses of users. For example, if an advertisement A is displayed when a user first accesses a web page, an advertisement B may be displayed when the user refreshes or reaccesses the same web page. If an advertisement A is displayed when a user X accesses a web page, an advertisement B may be displayed when a user Y accesses the same web page.

As shown in FIG. 1, moreover, when a plurality of advertisements are provided in the advertisement region 100, the advertisements provided in the advertisement region 100 and their order may be changed and displayed each time each user is accessed. That is, whenever each user accesses a web page, advertisements are randomly extracted from a database storing a plurality of advertisements by the number of corresponding advertisements that may be simultaneously inserted and are displayed.

As a method of extracting advertisements that are inserted in the advertisement region 100 of a web page from a database storing a plurality of advertisements, a related art method of determining the frequency of exposure to Internet advertisements will be described below.

When a b number of advertisements may be simultaneously inserted in the advertisement region 100, the advertisement region 100 is configured with a b number of advertisement slots. All advertisements, which are registered as being inserted in the advertisement region 100, are stored in the database. When the total number of advertisements registered in the database is 'a' and the advertisement region 100 has a b number of slots, the frequency of exposure to one individual advertisement is "b/a".

The CTRs of individual advertisements are shown to vary in a corresponding advertisement region according to factors such as the construction of advertisement sentences (for example, head copies) or the preference of businesses. Accordingly, although CTRs for individual advertisements vary, when all advertisements are randomly inserted at the same rate like a related art method, general advertisement effect decreases. That is, by exposing an advertisement having a high CTR and an advertisement having a low CTR at the same rate, it is impossible to maximize a general CTR.

As described above, two limitations that are caused when a general CTR decreases are as follows. First, all advertisers can achieve the purposes of advertisements by displaying advertisement web pages that are linked through users' clicks, and in this case, the decrease of a CTR denotes the general decrease of an advertisement effect. Second, when fee per click is applied according to a contract between an advertiser and a homepage provider or advertisement agent that provides a corresponding Internet advertisement, the homepage provider or the advertisement agent can merely obtain an advertisement profit equal to or lower than an average profit in a case where it provides an Internet advertisement having low advertisement attractiveness. That is, in all advertisers and a homepage provider or an advertisement agent that provides a corresponding Internet advertisement, the general decrease of a CTR causes the decrease of an advertisement effect and the decrease of an advertisement profit.

SUMMARY

Accordingly, the present invention provides a method and apparatus for providing Internet advertisement, which optimize a method of determining the frequency of exposure to individual Internet advertisements with a CTR, and thus enable all advertisers to obtain the maximum advertisement effects and enable a homepage provider or an advertisement agent, providing a corresponding Internet advertisement, to obtain the maximum advertisement profit.

The present invention also provides a method and apparatus for providing Internet advertisement, which place an advertisement having a high CRT in an upper group, place an advertisement having a low CRT in a lower group, apply a discount rate to the advertisement placed in the upper group, apply an extra charge rate to the advertisement placed in the lower group, and thus return a profit, which is obtained by the high advertisement effect of an Internet advertisement itself, to an advertiser, thereby enabling to rationally calculate an advertisement fee.

The present invention also provides a method and apparatus for providing Internet advertisement, which enable to multiply set the same advertisement as an individual Internet advertisement included in an advertisement pool, thereby satisfying the requirements of advertisers that desire more exposure.

The present invention also provides a method and apparatus for providing Internet advertisement, which set and store a plurality of head copies for the same advertisement as an individual Internet advertisement included in an advertisement pool and enable to process each of the stored head copies as an individual advertisement, thereby satisfying the requirements of advertisers that desire the exposure of various head copies.

The present invention also provides a method and apparatus for providing Internet advertisement, which segment a 24-hour day into the time slots of a certain unit and configure an advertisement pool with Internet advertisements having insertion time information corresponding to a time slot including the current time, thereby providing different advertisements with time.

According to an aspect, there is provided a method for providing a plurality of individual Internet advertisements, which are included in an advertisement pool which is configured with a plurality of advertisement groups '$G_1$' to '$G_m$' having a predetermined advertisement number rate '$N_i$', a predetermined exposure frequency setting value '$C_i$' and a correction coefficient '$K_i$', including: calculating a click through rate (hereinafter referred to as a CTR) to the number of times the individual Internet advertisements are exposed, in an advertisement providing server which provides one or more Internet advertisements to a web page providing server providing a web page including an Internet advertisement; calculating, by the advertisement providing server, an r value which is obtained by dividing an intermediate value of CTRs of the Internet advertisements included in the advertisement pool by an average value of the CTRs; arranging, by the advertisement providing server, the individual Internet advertisements of the advertisement pool in descending order of the CTRs from an upper group to a lower group according to the advertisement number rate '$N_i$'; and exposing, by the advertisement providing server, the individual Internet advertisements included in the each advertisement group '$G_i$' at a ratio of a frequency of exposure $$'A_i' \text{ "} \frac{C_i \times r^{K_i}}{\sum_{j=1}^{m} C_j \times r^{K_j}} \times \frac{1}{N_i} \text{"}$$

on an Internet through a web page, wherein a rate of an advertisement number rate of an upper group '$G_i$' to an exposure frequency setting value of the upper group '$G_i$' "$C_i/N_i$" is greater than a rate of an advertisement number rate of a lower group '$G_{i+1}$' to an exposure frequency setting value of the lower group '$G_{i+1}$' "$C_{i+1}/N_{i+1}$", and a correction coefficient '$K_i$' of the upper group '$G_i$' is greater than a correction coefficient '$K_{i+1}$' of the upper group '$G_{i+1}$'.

The method may further include: applying, by the advertisement providing server, advertisement fee per click which applies a base rate to an Internet advertisement comprised in a predetermined specific group, applies a discount rate to an Internet advertisement comprised in a higher group than the specific group, and applies an extra charge rate to an Internet advertisement comprised in a lower group than the specific group, after the exposing of the individual Internet advertisements.

In the method, a discount rate may increase as ranking of a group is higher up, and an extra charge rate may increase as ranking of a group is lower down.

In the method, an initial-registered individual Internet advertisement may be placed in a predetermined specific group '$G_x$'.

In the method, "x=[m/2]" or "x=[(m+1)/2]" is set (where [y] is y when y is an integer, and [y] is a maximum integer less than y when y is not an integer).

In the method, the calculating of an r value and the arranging of the individual Internet advertisements may be performed at every predetermined interval, and thereby the advertisement group placement of the individual Internet advertisements may be updated at every the interval.

In the individual Internet advertisements included in the advertisement pool, the same advertisement may be multiply set.

In the method, the individual Internet advertisements included in the advertisement pool may be set and stored as a plurality of head copies for the same advertisement, and each of the stored head copies may be processed into an individual advertisement.

In the method, a 24-hour day may be segment into time slots of a certain unit, and the each individual Internet advertisement may have insertion time information for at least one inserted time slot.

The method may further include configuring, by the advertisement providing server, the advertisement pool with Internet advertisements having insertion time information corresponding to a time slot including a current time, between the calculating of a CTR and the calculating of an r value.

In the method, the time slot may be segmented into six segments of from zero o'clock to four o'clock, from four o'clock to eight o'clock, from eight o'clock to twelve o'clock, from twelve o'clock to sixteen o'clock, from sixteen o'clock to twenty o'clock and from twenty o'clock to twenty-four o'clock.

In the calculating of an r value and the arranging of the individual Internet advertisements, the CTR may use a CTR which is calculated in the calculating of a CTR during a time slot of the day before, within a certain time from a start point of the time slot, and after a certain time elapses from the start point of the time slot, the CTR may use the CTR which is calculated in the calculating of a CTR, for time from the start point of the time slot to a current time.

In the method, the individual Internet advertisements included in the advertisement pool may be set and stored as a plurality of head copies, having different contents according to each time slot, for the same advertisement, and each of the stored head copies may be processed into an individual advertisement which comprises insertion time information corresponding to the time slot.

According to another aspect, there is provided a system for providing Internet advertisements, including a web page providing server providing a web page which includes an Internet advertisement, and an advertisement providing server providing one or more Internet advertisements to the web page providing server, including: an advertisement input unit storing an Internet advertisement, which is requested by an advertiser, in an advertisement database; an advertisement pool configuration unit selecting a portion of Internet advertisements stored in the advertisement database, configuring an advertisement pool, and storing the advertisement pool in an advertisement pool database; a Click Through Rate (CTR)

calculation unit calculating a CTR of an individual Internet advertisement, and an r value which is obtained by dividing an intermediate value of CTRs of the Internet advertisements included in the advertisement pool database by an average value of the CTRs; an advertisement group database storing a plurality of advertisement groups '$G_1$' to '$G_m$' having a predetermined advertisement number rate '$N_i$', a predetermined exposure frequency setting value '$C_i$' and a correction coefficient '$K_i$'; an advertisement group configuration unit arranging the individual Internet advertisements of the advertisement pool database in descending order of the CTRs from an upper group to a lower group according to the advertisement number rate '$N_i$', and storing the arranged advertisements in the advertisement group database; and an advertisement extraction unit exposing the individual Internet advertisements comprised in the each advertisement group '$G_i$' at a ratio of a frequency of exposure $$`A_i` \text{ ``} \frac{C_i \times r^{K_i}}{\sum_{j=1}^{m} C_j \times r^{K_j}} \times \frac{1}{N_i} \text{''}$$

on an Internet through a web page, wherein a rate of an advertisement number rate of an upper group '$G_i$' to an exposure frequency setting value of the upper group '$G_i$' "$C_i/N_i$" is greater than a rate of an advertisement number rate of a lower group '$G_{i+1}$' to an exposure frequency setting value of the lower group '$G_{i+1}$' "$C_{i+1}/N_{i+1}$", and a correction coefficient '$K_i$' of the upper group '$G_i$' is greater than a correction coefficient '$K_{i+1}$' of the upper group '$G_{i+1}$'.

The advertisement providing server may further include an advertisement fee calculation unit applying advertisement fee per click which applies a base rate to an Internet advertisement included in a predetermined base group, applies a discount rate to an Internet advertisement included in a higher group than the base group, and applies an extra charge rate to an Internet advertisement included in a lower group than the base group, when click information is received from the web page providing server.

In the system, the advertisement fee calculation unit may apply a discount rate which increases as ranking of a group is higher up, and the advertisement fee calculation unit may apply an extra charge rate which increases as ranking of a group is lower down.

In the system, the advertisement group configuration unit may place an initial-registered individual Internet advertisement in a predetermined specific group 'Gx'.

In the system, "x=[m/2]" or "x=[(m+1)/2]" may be set (where [y] is y when y is an integer, and [y] is a maximum integer less than y when y is not an integer).

In the system, the advertisement input unit multiply may receive the same advertisement, and the advertisement pool configuration unit may configure an advertisement pool by multiply using the same advertisement.

In the system, the advertisement input unit may receive a plurality of head copies for the same advertisement, and may store the head copies in the advertisement database, and the advertisement pool configuration unit may process each of the stored head copies into an individual advertisement.

In the system, a 24-hour day may be segment into time slots of a certain unit, the advertisement input unit may receive insertion time information for at least one inserted time slot when receiving the individual Internet advertisement, and the advertisement pool configuration unit may configure the advertisement pool with Internet advertisements having insertion time information corresponding to a time slot including a current time.

In the system, the time slot may be segmented into six segments of from zero o'clock to four o'clock, from four o'clock to eight o'clock, from eight o'clock to twelve o'clock, from twelve o'clock to sixteen o'clock, from sixteen o'clock to twenty o'clock and from twenty o'clock to twenty-four o'clock.

In the system, wherein when the CTR calculation unit calculates the r value and the advertisement group configuration unit configures an advertisement group, the CTR calculation unit and the advertisement group configuration unit may use a CTR which is calculated during a time slot of the day before, within a certain time from a start point of the time slot, and after a certain time elapses from the start point of the time slot, the CTR calculation unit and the advertisement group configuration unit may use a CTR which is calculated for time from the start point of the time slot to a current time.

In the system, the advertisement input unit may receive a plurality of head copies, which have different contents according to each time slot for the same advertisement, and insertion time information for a time slot where the head copies are inserted and may store the received head copies and information, and the advertisement pool configuration unit may configure the advertisement pool with Internet advertisements having insertion time information which corresponds to a time slot including a current time among the stored head copies.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Figure 1:
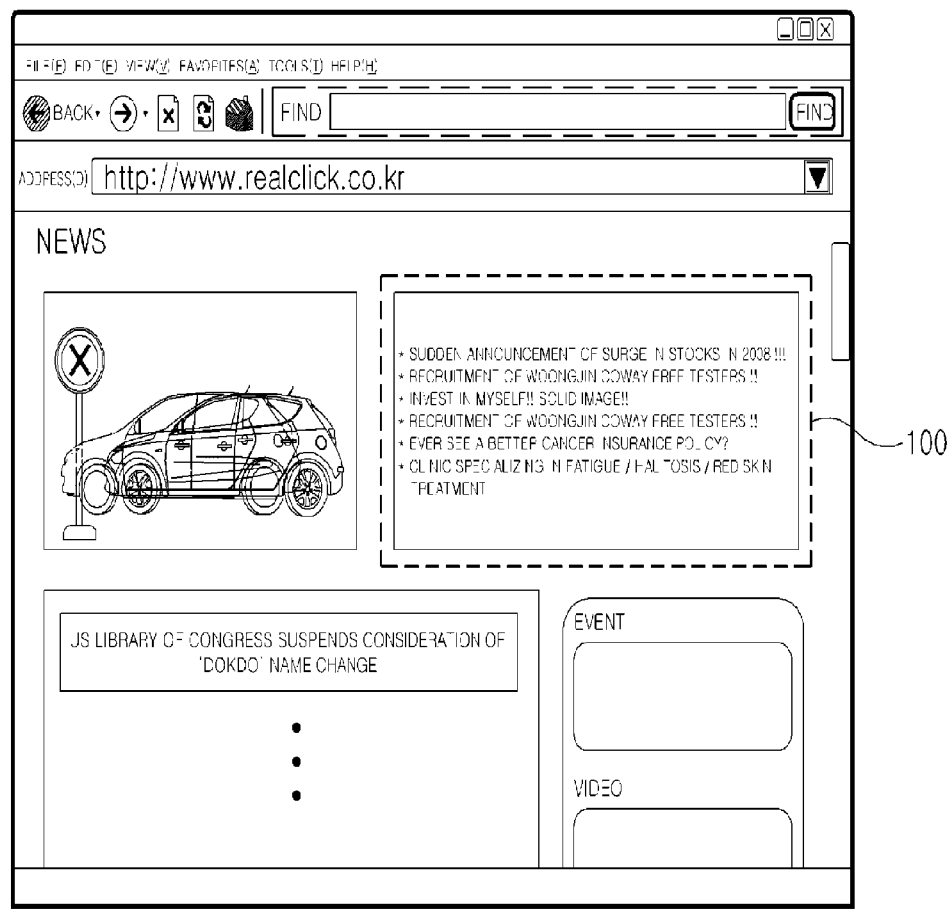
FIG. 1 is an exemplary diagram illustrating the web page of a portal site in which an Internet advertisement is inserted.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
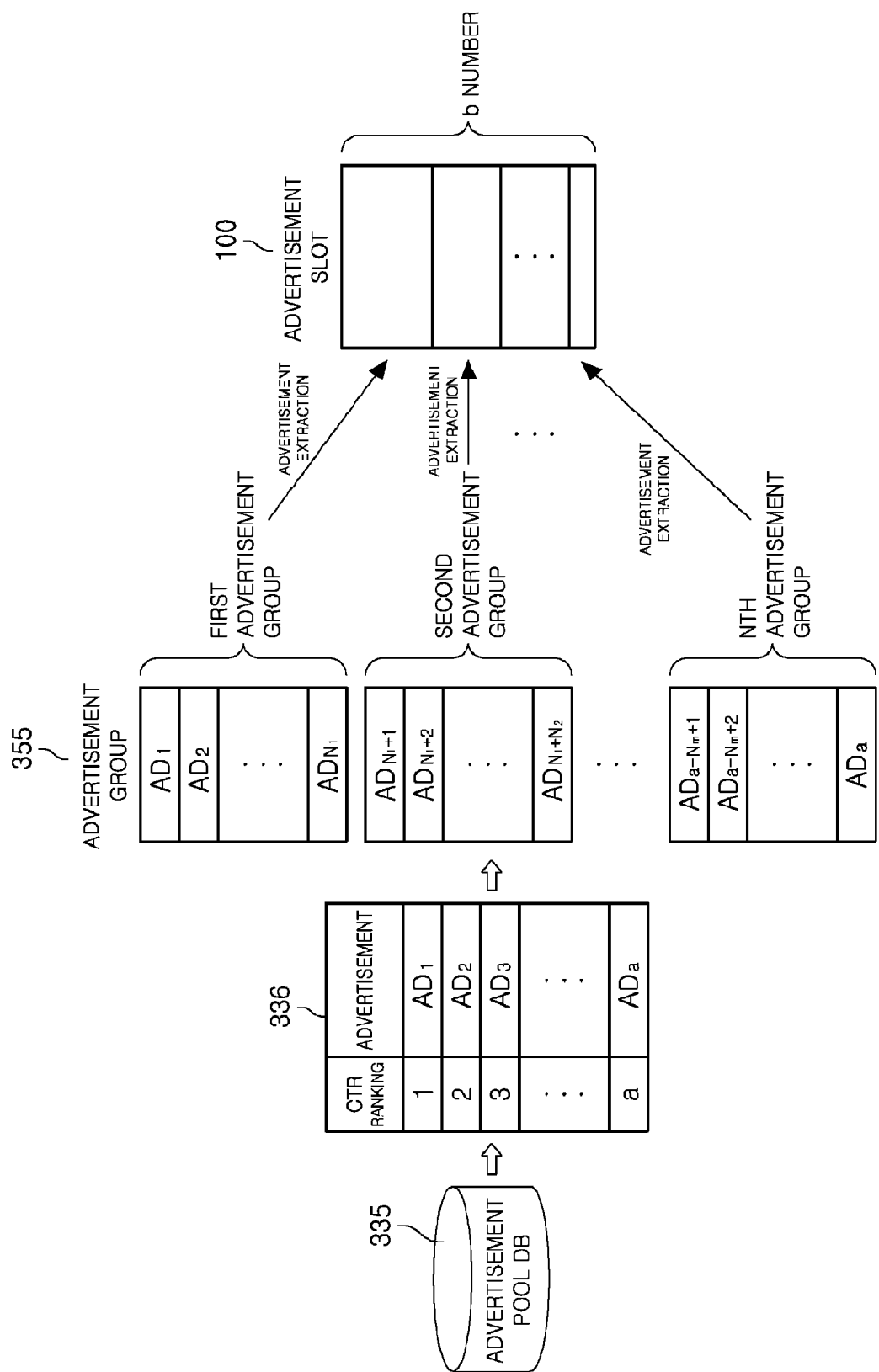
FIG. 2 is a diagram illustrating the concept of a method for providing Internet advertisement according to an embodiment of the present invention.

FIG. 2 is a diagram illustrating the concept of a method for providing Internet advertisement according to an embodiment of the present invention.

Referring to FIG. 2, individual Internet advertisements for an Internet advertisement configure an advertisement pool 335. The advertisement pool is configured with the individual Internet advertisements that are selected from among the Internet advertisement stored in an advertisement database which is configured with advertisement data where insertion requests are received from advertisers, and denotes a set of advertisements suitable for an insertion condition among all Internet advertisements that are stored in the advertisement database. As an application example of the insertion condition, when there is a designated insertion time in the individual Internet advertisement that is stored in the advertisement database, only advertisements where the designated insertion time corresponds to the current time among the Internet advertisements stored in the advertisement database are included. In a prepaid billing system, among the Internet advertisements stored in the advertisement database, only advertisements where a charged sum of money is not completely depleted may be included in the advertisement pool. According to an embodiment of the present invention, the individual Internet advertisement included in the advertisement pool is characterized by multiply setting the same advertisement. According to another embodiment of the present invention, the individual Internet advertisement included in the advertisement pool is characterized by setting and storing a plurality of head copies for the same advertisement and processing each of the stored head copies as an individual advertisement. According to another embodiment of the present invention, a 24-hour day is characterized by being segment into the time slots of a certain unit, the individual Internet advertisement is characterized by having insertion time information for at least one inserted time slot, and the advertisement pool is characterized by being configured with Internet advertisements having insertion time information corresponding to a time slot including the current time. Particularly, the time slot is characterized by being segmented into six segments of from zero o'clock to four o'clock, from four o'clock to eight o'clock, from eight o'clock to twelve o'clock, from twelve o'clock to sixteen o'clock, from sixteen o'clock to twenty o'clock and from twenty o'clock to twenty-four o'clock.

The individual advertisements included in the advertisement pool may be arranged in descending order of CTRs as a CTR ranking table 336.

Next, the individual advertisements included in the advertisement pool are placed in an advertisement group '$G_i$' according to CTR ranking. The advertisement group includes a predetermined advertisement number rate '$N_i$', a predetermined exposure frequency setting value '$C_i$' and a predetermined correction coefficient '$K_i$'. To express the setting values of the advertisement group as a table, the table is as follows.

TABLE 1

| | Advertisement number rates | Exposure frequency setting values | Correction coefficients |
| --- | --- | --- | --- |
| First group | $N_1$ | $C_1$ | $K_1$ |
| Second group | $N_2$ | $C_2$ | $K_2$ |
| . | . | . | . |
| . | . | . | . |
| . | . | . | . |
| (m-1)th group | $N_{(m-1)}$ | $C_{(m-1)}$ | $K_{(m-1)}$ |

TABLE 1-continued

| | Advertisement number rates | Exposure frequency setting values | Correction coefficients |
| --- | --- | --- | --- |
| mth group | $N_m$ | $C_m$ | $K_m$ |
| Sum | 1 | 1 | |

Herein, the advertisement number rate '$N_i$' is the rate of the total number of advertisements included in the advertisement pool 335 to the number of advertisements included in each of the advertisement groups. For example, if $N_3=0.2$, this denotes that about 20% of the advertisements included in the advertisement pool 335 is included in the third advertisement group. Accordingly, all the individual advertisements included in the advertisement pool 335 are arranged in descending order of CTRs from an upper group to a lower group according to the advertisement number rate '$N_i$', in the CTR ranking table 336. As shown in FIG. 2, advertisement $AD_1$ to advertisement $AD_{N1}$ are arranged in the first advertisement group, and advertisement $AD_{N1+1}$ to advertisement $AD_{N1+N2}$ are arranged in the second advertisement group.

The exposure frequency setting value '$C_i$' is a base rate in which the individual advertisements included in the each advertisement group are inserted in an advertisement slot 100. For example, if $C_i=0.3$, this denotes that about 30% of the advertisement slot 100 is on the basis of that the advertisements of the first advertisement group are inserted. According to an embodiment of the present invention, since the frequency of exposure to an advertisement having a high CTR should be high, the rate of the advertisement number rate of an upper group '$G_i$' to the exposure frequency setting value of the upper group '$G_i$' "$C_i/N_i$" is greater than the rate of the advertisement number rate of a lower group '$G_{i+1}$' to the exposure frequency setting value of the lower group '$G_{i+1}$' "$C_{i+1}/N_{i+1}$" (condition 1).

The correction coefficient '$K_i$' is a value for correcting the exposure frequency setting value '$C_i$' on the basis of the intermediate value of a CTR to the average value of the CTR ratio. Reasons requiring the correction are as follows. When the intermediate value of the CTR is greater than the average value of the CTR, this denotes that there are many advertisements having a CTR higher than an average CTR among all advertisements. In this case, by decreasing the relative importance of the exposure of the advertisements belonging to an upper group and increasing the relative importance of the exposure of the advertisements belonging to a lower group, a CTR becomes closer to the average CTR. On the other hand, when the intermediate value of the CTR is less than the average value of the CTR, this denotes that there are many advertisements having a CTR lower than the average CTR among all advertisements. In this case, by increasing the relative importance of the exposure of the advertisements belonging to an upper group and decreasing the relative importance of the exposure of the advertisements belonging to a lower group, a CTR becomes closer to the average CTR.

A correction equation for the relative importance of exposure is expressed as Equation (1) below.

$$\text{exposure frequency function of } i\text{th group} = f_i(r) = C_i^*(r)^{K_i} \quad (1)$$

where r is a variable denoting "intermediate value of CTRs/average value of CTRs".

As the intermediate value of the CTR becomes greater than the average value of the CTR, the frequency of exposure to an upper group should be low. Therefore, the correction coefficient '$K_i$' of the upper group '$G_i$' should be greater than the correction coefficient '$K_{i+1}$' of the upper group '$G_{i+1}$' (condition 2).

The frequency of exposure to the each group '$G_i$' is expressed as Equation (2) below.

$$\text{frequency of exposure to } ith \text{ group} = F_i(r) = \frac{f_i(r)}{\sum_{j=1}^{m} \wedge f_j(r)} \quad (2)$$

The frequency of exposure to each individual advertisement belonging to the each group '$G_i$' is expressed as Equation (3) below.

$$\text{frequency of exposure to each individual advertisement of } ith \text{ group} = A_i(r) = \frac{f_i(r)}{N_i} \quad (3)$$

That is, the frequency '$A_i$' of exposure to each individual Internet advertisement belonging to the each group '$G_i$' is expressed as Equation below.

$$\frac{C_i \times r^{K_i}}{\sum_{j=1}^{m} C_j \times r^{K_j}} \times \frac{1}{N_i}$$

Hereinafter, an application example of an embodiment of the present invention will be described with numerals.

It is assumed that each setting value is as listed in the following Table 2 and hundred advertisements are included in the advertisement pool.

TABLE 2

| | Advertisement number rates | Exposure frequency setting values | Correction coefficients |
|---|---|---|---|
| First group | 0.25 | 0.4 | 1 |
| Second group | 0.50 | 0.5 | 0 |
| Third group | 0.25 | 0.1 | −1 |
| Sum | 1 | 1 | |

Since 0.4/0.25>0.5/0.5>0.1/0.25, the condition 1 is satisfied. Moreover, since 1>0>−1, the condition 2 is satisfied.

First, when r=1.2, a result is as follows.

$f_1(1.2)=0.4*(1.2)^1=0.48$ $f_2(1.2)=0.5*(1.2)^0=0.5$ $f_3(1.2)=0.1*(1.2)^{-1}=0.083$ $F_1(1.2)=0.452, F_2(1.2)=0.470, F_3(1.2)=0.078$ $A_1=F_1/(100*0.25)=0.0181,$ $A_2=F_2/(100*0.50)=0.0094,$ $A_3=F_3/(100*0.10)=0.0031$

Second, when r=1, a result is as follows.

$f_1(1)=0.4*(1)^1=0.40$ $f_2(1)=0.5*(1)^0=0.5$ $f_3(1)=0.1*(1)^{-1}=0.1$ $F_1(1)=0.4, F_2(1)=0.5, F_3(1)=0.1$ $A_1=F_1/(100*0.25)=0.016,$ $A_2=F_2/(100*0.50)=0.010,$ $A_3=F_3/(100*0.10)=0.004$

Third, when r=0.8, a result is as follows.

$f_1(0.8)=0.4*(0.8)^1=0.32$ $f_2(0.8)=0.5*(0.8)^0=0.5$ $f_3(0.8)=0.1*(0.8)^{-1}=0.125$ $F_1(0.8)=0.339, F_2(0.8)=0.529, F_3(0.8)=0.132$ $A_1=F_1/(100*0.25)=0.01356,$ $A_2=F_2/(100*0.50)=0.01058,$ $A_3=F_3/(100*0.10)=0.00528$

To analyze the results, when the intermediate value of the CTR is greater than the average value of the CTR, the frequency of exposure to the each advertisement of the first group become higher, and the frequency of exposure to the each advertisement of the third group become lower. On the other hand, when the intermediate value of the CTR is less than the average value of the CTR, the frequency of exposure to the each advertisement of the first group become lower, and the frequency of exposure to the each advertisement of the third group become higher. By controlling the frequency of exposure to the each advertisement of the each advertisement group based on these results, all advertisements have an enhanced average CTR, and thus general advertisement effects increase. Accordingly, the method for providing Internet advertisement according to an embodiment of the present invention enables all advertisers to obtain the maximum advertisement effects and enables a homepage provider or an advertisement agent, which provides a corresponding Internet advertisement, to obtain the maximum advertisement profit, through the above-described configuration.

Figure 3:
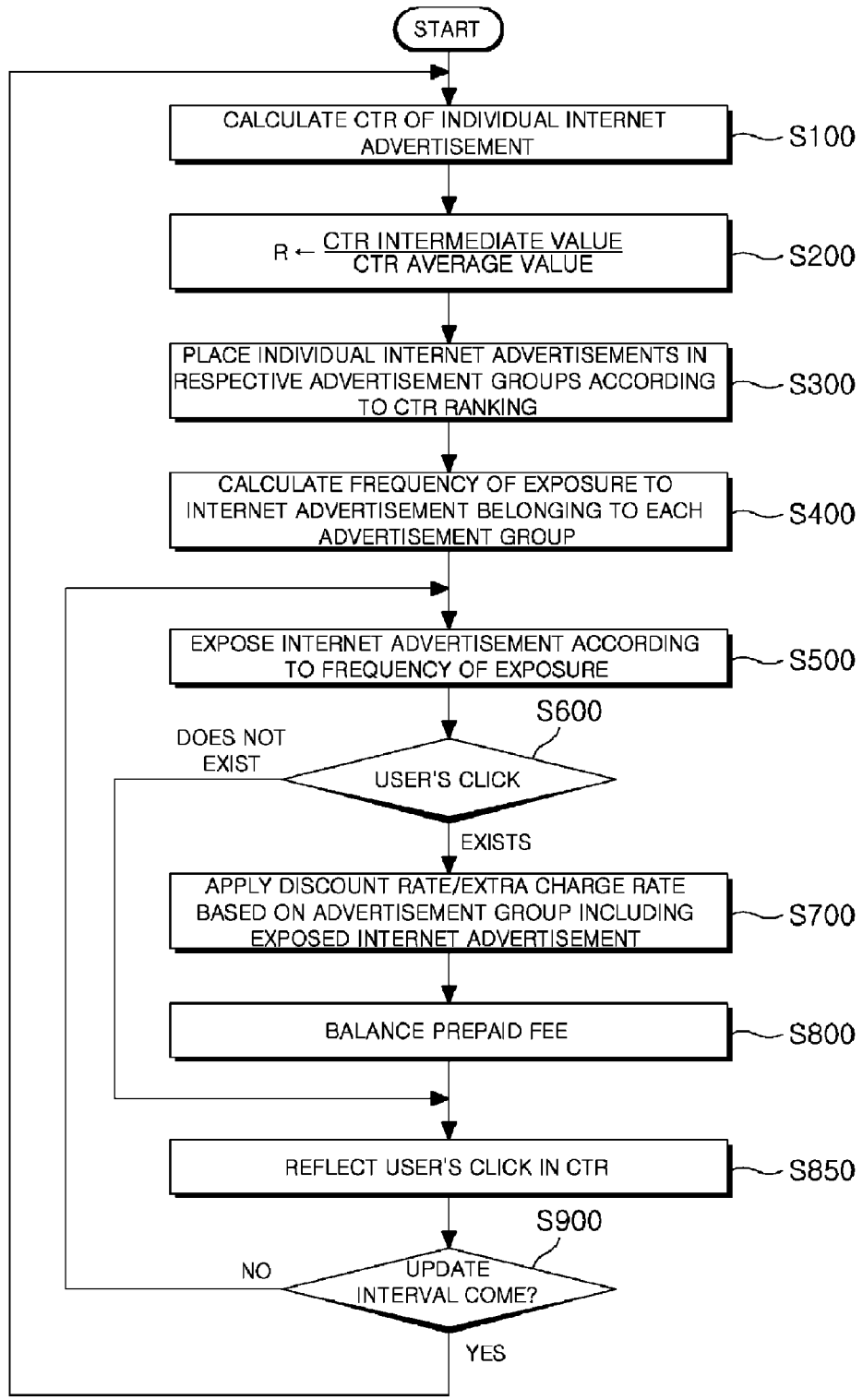
FIG. 3 is a flowchart illustrating the entire operation of a method for providing Internet advertisement according to an embodiment of the present invention.

FIG. 3 is a flowchart illustrating the entire operation of a method for providing Internet advertisement according to an embodiment of the present invention.

First, an advertisement providing server calculates the CTR of each individual Internet advertisement in operation S100.

The advertisement providing server exposes all advertisements at the same rate in the advertisement region of a corresponding web page for an initial certain duration for calculating the CTR of the individual Internet advertisement, and calculates the CTR of the each individual advertisement to write the CTR ranking table. After the initial certain duration elapses, as described below, the CTR value of the each individual advertisement is updated by a method for providing advertisements that is continuously performed in accordance with an embodiment of the present invention, and thus the CTR ranking table and the r value are updated.

The advertisement providing server calculates the r value, being "intermediate value of CTRs/average value of CTRs", with the CTR of the each individual Internet advertisement that has been calculated through operation S100, in operation S200. Subsequently, the advertisement providing server places the individual Internet advertisements in respective advertisement groups according to CTR ranking in operation S300. In a method of placing the individual Internet advertisements, as described above, an advertisement having a high CTR is placed in an upper group, and an advertisement having a low CTR is placed in a lower group. A criterion of detailed placement is as described above.

According to an embodiment of the present invention, a 24-hour day is segmented into the time slots of a certain unit, and the individual Internet advertisement has insertion time information one at least one time slot inserted. The advertisement pool is configured with Internet advertisements having insertion time information corresponding to a time slot including the current time. In this case, a CTR value used in operations S200 and S300 uses a CTR that has been calculated during the time slot of the day before within a certain time from the start point of the time slot through operation S100. After a certain time elapses from the start point of the time slot, the CTR that has been calculated for time from the start point of the time slot to the current time through operation S100 is used. According to an embodiment of the present invention, in this case, the individual Internet advertisement included in the advertisement pool sets and stores a plurality of head copies, having different contents according to each time slot, for the same advertisement, and processes the stored each head copy into an individual advertisement having insertion time information corresponding to the time slot.

Subsequently, the advertisement providing server calculates the frequency of exposure to the individual Internet advertisements belonging to the each advertisement group in operation S400. Content for the calculation of the frequency of exposure is as described above.

The advertisement providing server exposes Internet advertisements in a web page according to the frequency of exposure to the each individual Internet advertisement in operation S500.

In this case, the advertisement providing server determines whether a user clicks the Internet advertisement in operation S600. When the user clicks the Internet advertisement, the advertisement providing server applies an extra charge rate or a discount rate based on an advertisement group including the exposed Internet advertisement in operation S700. The advertisement rate applies a base rate to an Internet advertisement belonging to a predetermined specific group, applies a discount rate to an Internet advertisement belonging to a higher group than the specific group, and applies an extra charge rate to an Internet advertisement belonging to a lower group than the specific group. As the ranking of the group is higher up, the discount rate increases. As the ranking of the group is lower down, the extra charge rate increases. The method for providing Internet advertisement according to an embodiment of the present invention returns profits, which are obtained by the high advertisement effect of the Internet advertisement itself, to an advertiser, and thus enables to rationally calculate an advertisement fee.

An advertisement fee applying the extra charge rate or the discount rate is balanced from a prepaid fee that has been charged beforehand by an advertiser in operation S800. Balancing the prepaid fee is one embodiment, and it is apparent to those skilled in the art that a deferred payment system, which accumulates the advertisement fee and asks to pay later, may be applied as another embodiment of the present invention.

Subsequently, the advertisement providing server reflects whether the user clicks the Internet advertisement in the CTR of an individual advertisement in operation S700. When the determination result of operation S600 shows that the user clicks the Internet advertisement, by adding one to a numerator and a denominator, a CTR becomes higher. When the user does not click the Internet advertisement, by only adding one to a denominator, a CTR becomes lower.

The advertisement providing server inserts advertisements in one web page and applies fee for use through the operations. Operations after operation S500 are repeatedly performed until an update interval has come.

When the update interval has come in operation S900, the advertisement providing server returns to operation S100, calculates a new r value, replaces the each advertisement group in operation S300, and resets the frequency of exposure in operation S400.

Herein, when there is an individual Internet advertisement that is registered while performing the method for providing Internet advertisement which is continuously performed according to an embodiment of the present invention, handling this is important. According to an embodiment of the present invention, the initial-registered individual Internet advertisement may be unconditionally placed in a predetermined specific group '$G_x$', wherein "x=[m/2]" or "x=[(m+1)/2]" may be set (where [y] is called Gaussian function, [y] is y when y is an integer, and [y] is the maximum integer less than y when y is not an integer). That is, the initial-registered individual Internet advertisement may be placed in a group having intermediate ranking among the advertisement groups.

Figure 4:
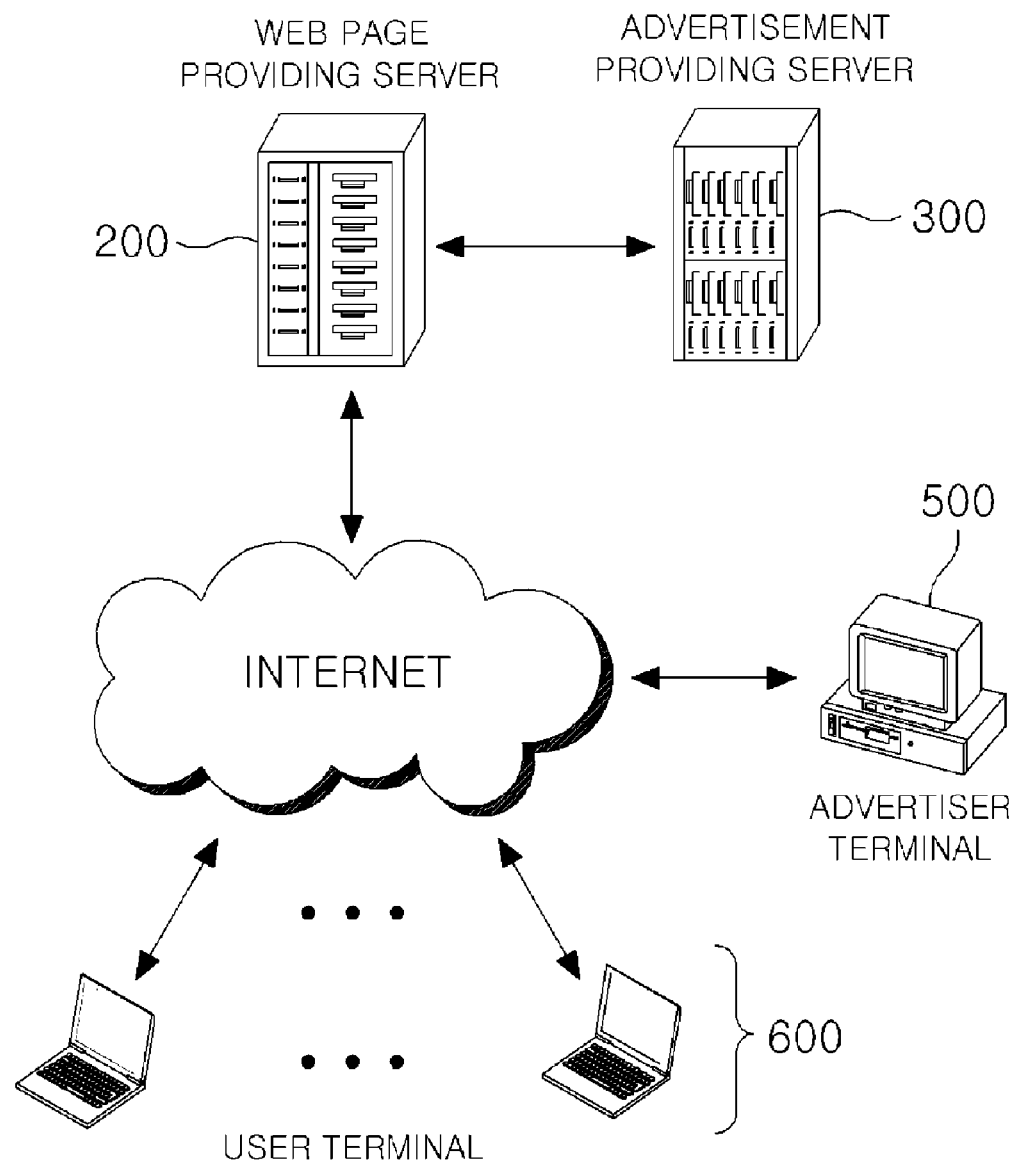
FIG. 4 is a block diagram illustrating a system for providing Internet advertisement according to an embodiment of the present invention.

FIG. 4 is a block diagram illustrating a system for providing Internet advertisement according to an embodiment of the present invention.

Referring to FIG. 4, a system for providing Internet advertisement according to an embodiment of the present invention includes a web page providing serve 200 and an advertisement providing server 300.

The web page providing server 200 performs a function of providing a web page that includes the advertisement slot 100 configured with at least one Internet advertisement. Examples of the web page providing server 200 may include an Internet portal that provides a plurality of Internet advertisements through a web page, or the home page of a newspaper company or a broadcasting company.

The advertisement providing server 300 provides at least one Internet advertisement to be inserted in a corresponding advertisement slot 100, to the web page providing server 200. The advertisement providing server 300 receives information on the number of exposure times and the number of click times for each advertisement that is inserted in a web page and calculates a CTR.

In FIG. 4, although the web page providing server 200 is illustrated independently of the advertisement providing server 300, the web page providing server 200 and the advertisement providing server 300 may be implemented as one server system depending on the case. For example, it is apparent to those skilled in the art that the web page providing server 200 and the advertisement providing server 300 may access each other through an intermediate system for integrated advertisement service like an advertisement agent server.

Figure 5:
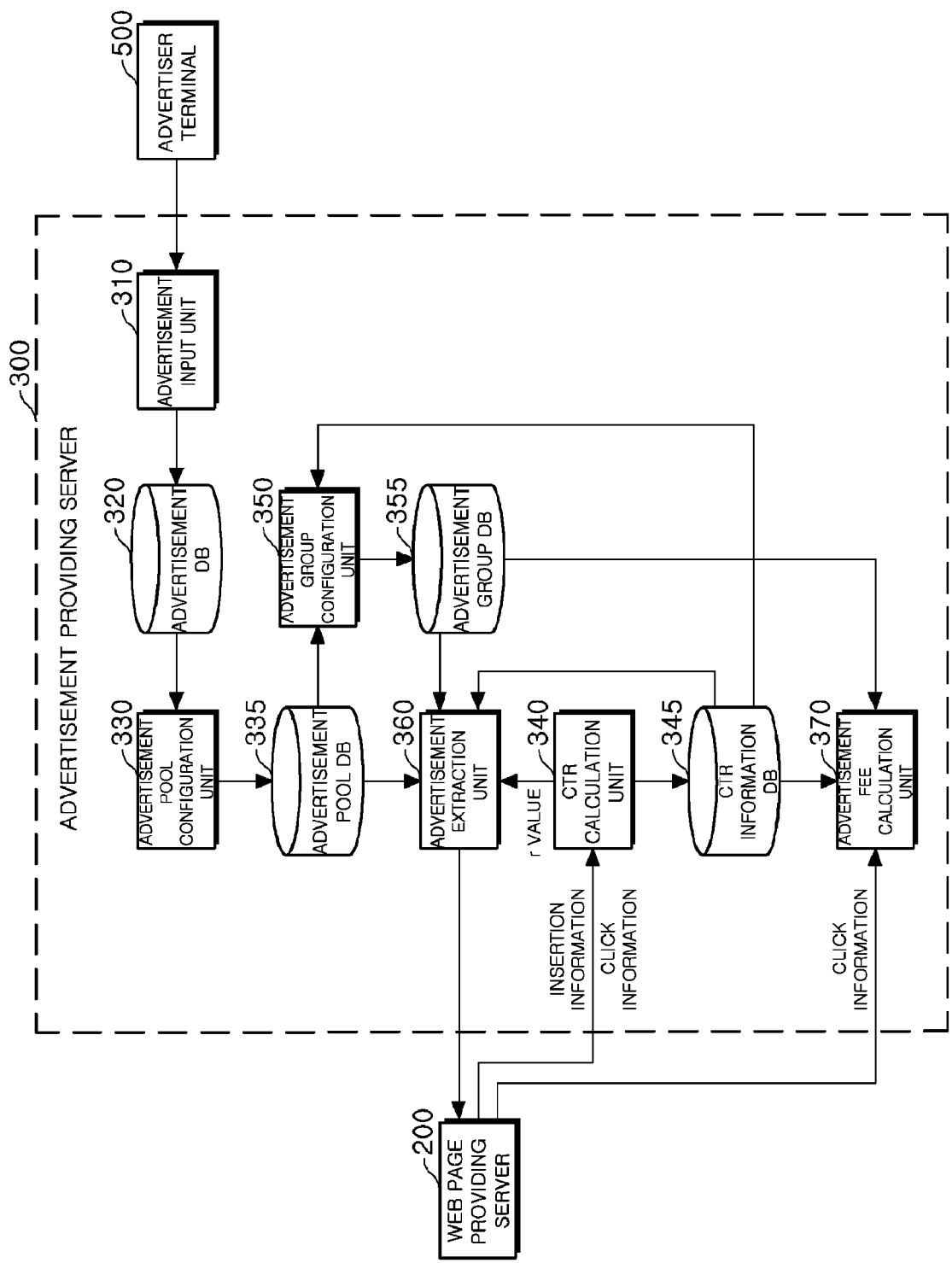
FIG. 5 is a block diagram illustrating the detailed configuration of an advertisement providing server according to an embodiment of the present invention.

FIG. 5 is a block diagram illustrating the detailed configuration of the advertisement providing server 300 according to an embodiment of the present invention.

Referring to FIG. 5, the advertisement providing server 300 may include an advertisement input unit 310, an advertisement pool configuration unit 330, a CTR calculation unit 340, an advertisement group configuration unit 350, an advertisement extraction unit 360, and an advertisement fee calculation unit 370.

The advertisement input unit 310 receives advertisement data from the advertiser terminal 500 of an advertiser requesting the insertion of Internet advertisement and stores the advertisement data in an advertisement database 320.

The advertisement pool configuration unit 330 selects a portion of Internet advertisements which are stored in the advertisement database 320 to configure an advertisement pool and stores the advertisement pool in an advertisement pool database 335. The advertisement pool denotes a set of advertisements in accordance with an insertion condition among all Internet advertisements that are stored in the advertisement database 320. As an application example of the insertion condition, when each individual Internet advertisement stored in the advertisement database 320 have a designated insertion time, the advertisement pool includes only advertisements, in which the designated insertion time corresponds to the current time, among the individual Internet advertisements stored in the advertisement database 320. In a prepaid billing system, among the Internet advertisements stored in the advertisement database 320, only advertisements where a charged sum of money is not completely depleted may be included in the advertisement pool. Herein, unlike the advertisement database 320, the advertisement pool database 335 needs not store all advertisement data received from the advertiser terminal 500 and may store only location information including the address values or reference values of the individual Internet advertisements that are stored in the advertisement database 320. Moreover, the advertisement database 320 and the advertisement pool database 335 need not be implemented in an individual storage, and by giving a specific setting value to advertisement data stored in one storage and the advertisement database 320, the advertisement pool may be configured. That is, an embodiment of the present invention in FIG. 5, including the advertisement database 320, the advertisement pool configuration unit 330 and the advertisement pool database 335, is for describing a conceptual set of advertisements called an advertisement pool. The above-described implementation methods may be clearly modified and applied by those skilled in the art with the concept of the advertisement pool, and they are included in the spirit and scope of the present invention.

The CTR calculation unit 340 calculates the CTR of each individual Internet advertisement and stores the calculated CTR in the CTR information database 345. The CTR calculation unit 340 calculates an r value being the intermediate value/average value of the CTRs of Internet advertisements that are included in the advertisement pool database 335.

The advertisement group database 355 stores a plurality of advertisement groups '$G_1$' to '$G_m$' having a predetermined advertisement number rate '$N_i$', a predetermined exposure frequency setting value '$C_i$' and a predetermined correction coefficient '$K_i$'. Concepts on the advertisement number rate '$N_i$', the exposure frequency setting value '$C_i$' and the correction coefficient '$K_i$' are as described above with reference to FIG. 2. Moreover, the advertisement group configuration unit 350 arranges all the individual advertisements, which are included in the advertisement pool database 335, in descending order of CTRs from an upper group to a lower group according to the advertisement number rate '$N_i$'. The detailed contents of the configurations of the advertisement groups are as described above with reference to FIG. 2. Herein, unlike the advertisement database 320, the advertisement group database 355 needs not store all advertisement data, which are received from the advertiser terminal 500, for each advertisement group and may store only location information including the address values or reference values of the individual Internet advertisements that are stored in the advertisement database 320. Moreover, the advertisement database 320 and the advertisement group database 355 need not be implemented in an individual storage, and by giving a specific setting value to advertisement data stored in one storage and the advertisement database 320, the advertisement group may be configured. That is, an embodiment of the present invention in FIG. 5, including the advertisement database 320, the advertisement group configuration unit 350 and the advertisement group database 355, is for describing conceptual sets of advertisements called an advertisement group. The above-described implementation methods may be clearly modified and applied by those skilled in the art with the concept of the advertisement group, and they are included in the spirit and scope of the present invention. According to an embodiment of the present invention, the advertisement group configuration unit 350 may unconditionally place the initial-registered individual Internet advertisement in a predetermined specific group '$G_x$', wherein "x=[m/2]" or "x=[(m+1)/2]" may be set (where [y] is called Gaussian function, [y] is y when y is an integer, and [y] is the maximum integer less than y when y is not an integer). That is, the initial-registered individual Internet advertisement may be placed in a group having intermediate ranking among the advertisement groups.

The advertisement extraction unit 360 provides the individual Internet advertisements belonging to the each advertisement group '$G_i$' at the ratio of the frequency '$A_i$' of exposure $$"\frac{C_i \times r^{K_i}}{\sum_{j=1}^{m} C_j \times r^{K_j}} \times \frac{1}{N_i}"$$

to the web page providing server 200. Among values for determining the frequency '$A_i$' of exposure, $N_i$, and $K_i$ are setting values that have been predetermined and constants (wherein the constant values may be varied by the manager of the advertisement providing server). The r value is a variable varying with time, and the advertisement extraction unit 360 references (which is indicated by an arrow depicted with a dotted line) a value extracted by the CTR calculation unit 340. Herein, as described above with reference to FIG. 2, the rate of the advertisement number rate of an upper group '$G_i$' to the exposure frequency setting value of the upper group '$G_i$' "$C_i/N_i$" should be greater than the rate of the advertisement number rate of a lower group '$G_{i+1}$' to the exposure frequency setting value of the lower group '$G_{i+1}$' "$C_{i+1}/N_{i+1}$", and the correction coefficient '$K_i$' of the upper group '$G_i$' should be greater than the correction coefficient '$K_{i+1}$' of the upper group '$G_{i+1}$'.

When the advertisement fee calculation unit 370 receives click information from the web page providing server 200, it applies advertisement fee per click that applies a base rate to an Internet advertisement belonging to a predetermined specific group (hereinafter referred to as a base group), applies a discount rate to an Internet advertisement belonging to a higher group than the base group, and applies an extra charge rate to an Internet advertisement belonging to a lower group than the base group. According to embodiments of the present invention, the advertisement fee calculation unit 370 applies a discount rate that increases as the ranking of the group is higher up, and applies an extra charge rate that increases as the ranking of the group is lower down. That is, the advertisement fee calculation unit 370 applies a higher discount rate as a CTR is higher up, and applies a higher extra charge rate as a CTR is lower down. The method for providing Internet advertisement according to an embodiment of the present invention returns profits, which are obtained by the high advertisement effect of the Internet advertisement itself, to an advertiser, and thus enables to rationally calculate an advertisement fee.

According to embodiments of the present invention, the advertisement input unit 310 may multiply receive the same advertisement, and the advertisement pool configuration unit 330 may configure an advertisement pool by multiply using the same advertisement.

According to embodiments of the present invention, the advertisement input unit 310 may set and receive a plurality of head copies for the same advertisement, and may store the head copies in the advertisement database. The advertisement pool configuration unit 330 processes each of the stored head copies into an individual advertisement.

According to embodiments of the present invention, a 24-hour day may be segment into the time slots of a certain unit, and the advertisement input unit 310 may receive insertion time information for at least one inserted time slot when receiving the individual Internet advertisement. The advertisement pool configuration unit 330 may configure the advertisement pool with Internet advertisements having insertion time information corresponding to a time slot including the current time. In this case, the time slot may be segmented into six segments of from zero o'clock to four o'clock, from four o'clock to eight o'clock, from eight o'clock to twelve o'clock, from twelve o'clock to sixteen o'clock, from sixteen o'clock to twenty o'clock and from twenty o'clock to twenty-four o'clock. Moreover, the CTR calculation unit 340 calculates the r value. In configuring of advertisement groups, the advertisement group configuration unit 350 uses a CTR that has been calculated during the time slot of the day before within a certain time from the start point of the time slot. After a certain time elapses from the start point of the time slot, the advertisement group configuration unit 350 uses the CTR that has been calculated for time from the start point of the time slot to the current time. The advertisement input unit 310 receives a plurality of head copies, which have different contents according to each time slot for the same advertisement, and insertion time information for a time slot where the head copies are inserted, and stores the received head copies and information. The advertisement pool configuration unit 330 configures the advertisement pool with Internet advertisements having insertion time information that corresponds to a time slot including the current time among the stored head copies.

The method and apparatus for providing Internet advertisement according to embodiments of the present invention optimize a method of determining the frequency of exposure to individual Internet advertisements with a CTR, and thus enable all advertisers to obtain the maximum advertisement effects and enable a homepage provider or an advertisement agent, providing a corresponding Internet advertisement, to obtain the maximum advertisement profit.

The method and apparatus for providing Internet advertisement according to embodiments of the present invention place an advertisement having a high CRT in an upper group, place an advertisement having a low CRT in a lower group, apply a discount rate to the advertisement placed in the upper group, apply an extra charge rate to the advertisement placed in the lower group, and thus return a profit, which is obtained by the high advertisement effect of an Internet advertisement itself, to an advertiser, thereby enabling to rationally calculate an advertisement charge.

The method and apparatus for providing Internet advertisement according to embodiments of the present invention enable to multiply set the same advertisement as an individual Internet advertisement included in an advertisement pool, thereby satisfying the requirements of advertisers that desire more exposure.

The method and apparatus for providing Internet advertisement according to embodiments of the present invention set and store a plurality of head copies for the same advertisement as an individual Internet advertisement included in an advertisement pool and enable to process each of the stored head copies as an individual advertisement, thereby satisfying the requirements of advertisers that desire the exposure of various head copies.

The method and apparatus for providing Internet advertisement according to embodiments of the present invention segment a 24-hour day into the time slots of a certain unit and configure an advertisement pool with Internet advertisements having insertion time information corresponding to a time slot including the current time, thereby providing different advertisements with time.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for providing a plurality of individual Internet advertisements included in an advertisement pool which is configured with a plurality of advertisement groups '$G_1$' to '$G_m$' having a predetermined advertisement number rate '$N_i$', a predetermined exposure frequency setting value '$C_i$' and a correction coefficient '$K_i$', the method comprising:

calculating a click through rate (hereinafter referred to as a CTR) to the number of times the individual Internet advertisements are exposed, in an advertisement providing server which provides one or more Internet advertisements to a web page providing server providing a web page comprising an Internet advertisement;

calculating, by the advertisement providing server, an r value which is obtained by dividing an intermediate value of CTRs of the Internet advertisements comprised in the advertisement pool by an average value of the CTRs;

arranging, by the advertisement providing server, the individual Internet advertisements of the advertisement pool in descending order of the CTRs from an upper group to a lower group according to the advertisement number rate '$N_i$'; and exposing, by the advertisement providing server, the individual Internet advertisements comprised in the each advertisement group '$G_i$' at a ratio of a frequency of exposure '$A_i$'

$$"\frac{C_i \times r^{K_i}}{\sum_{j=1}^{m} C_j \times r^{K_j}} \times \frac{1}{N_i}"$$

on an Internet through a web page,
wherein a rate of an advertisement number rate of an upper group '$G_i$' to an exposure frequency setting value of the upper group '$G_i$' "$C_i/N_i$" is greater than a rate of an advertisement number rate of a lower group '$G_{i+1}$' to an exposure frequency setting value of the lower group '$G_{i+1}$' "$C_{i+1}/N_{i+1}$", and a correction coefficient '$K_i$' of the upper group '$G_i$' is greater than a correction coefficient '$K_{i+1}$' of the upper group '$G_{i+1}$'.

2. The method of claim 1, further comprising: applying, by the advertisement providing server, advertisement fee per click which applies a base rate to an Internet advertisement comprised in a predetermined specific group, applies a discount rate to an Internet advertisement comprised in a higher group than the specific group, and applies an extra charge rate to an Internet advertisement comprised in a lower group than the specific group, after the exposing of the individual Internet advertisements.

3. The method of claim 2, wherein:
a discount rate increases as ranking of a group is higher up, and
an extra charge rate increases as ranking of a group is lower down.

4. The method of claim 1, wherein an initial-registered individual Internet advertisement is placed in a predetermined specific group '$Gx$'.

5. The method of claim 4, wherein "$x=[m/2]$" or "$x=[(m+1)/2]$" is set (where [y] is y when y is an integer, and [y] is a maximum integer less than y when y is not an integer).

6. The method of claim 1, wherein the calculating of an r value and the arranging of the individual Internet advertisements are performed at every predetermined interval, and thereby the advertisement group placement of the individual Internet advertisements is updated at every the interval.

7. The method of claim 1, wherein in the individual Internet advertisements comprised in the advertisement pool, the same advertisement is multiply set.

8. The method of claim 1, wherein:
the individual Internet advertisements comprised in the advertisement pool are set and stored as a plurality of head copies for the same advertisement, and
each of the stored head copies is processed into an individual advertisement.

9. The method of claim 1, wherein:
a 24-hour day is segment into time slots of a certain unit,
the each individual Internet advertisement has insertion time information for at least one inserted time slot, and
the method further comprises configuring, by the advertisement providing server, the advertisement pool with Internet advertisements having insertion time information corresponding to a time slot including a current time, between the calculating of a CTR and the calculating of an r value.

10. The method of claim 9, wherein the time slot is segmented into six segments of from zero o'clock to four o'clock, from four o'clock to eight o'clock, from eight o'clock to twelve o'clock, from twelve o'clock to sixteen o'clock, from sixteen o'clock to twenty o'clock and from twenty o'clock to twenty-four o'clock.

11. The method of claim 9, wherein in the calculating of an r value and the arranging of the individual Internet advertisements,
the CTR uses a CTR which is calculated in the calculating of a CTR during a time slot of the day before, within a certain time from a start point of the time slot, and
after a certain time elapses from the start point of the time slot, the CTR uses the CTR which is calculated in the calculating of a CTR, for time from the start point of the time slot to a current time.

12. The method of claim 9, wherein:
the individual Internet advertisements comprised in the advertisement pool are set and stored as a plurality of head copies, having different contents according to each time slot, for the same advertisement, and
each of the stored head copies is processed into an individual advertisement which comprises insertion time information corresponding to the time slot.

13. A system for providing Internet advertisements including: a web page providing server providing a web page which includes an Internet advertisement; and an advertisement providing server providing one or more Internet advertisements to the web page providing server, the advertisement providing server comprising:
an advertisement input unit storing an Internet advertisement, which is requested by an advertiser, in an advertisement database;
an advertisement pool configuration unit selecting a portion of Internet advertisements stored in the advertisement database, configuring an advertisement pool, and storing the advertisement pool in an advertisement pool database;
a Click Through Rate (CTR) calculation unit calculating a CTR of an individual Internet advertisement, and an r value which is obtained by dividing an intermediate value of CTRs of the Internet advertisements comprised in the advertisement pool database by an average value of the CTRs;
an advertisement group database storing a plurality of advertisement groups '$G_1$' to '$G_m$' having a predetermined advertisement number rate '$N_i$', a predetermined exposure frequency setting value '$C_i$' and a correction coefficient '$K_i$';
an advertisement group configuration unit arranging the individual Internet advertisements of the advertisement pool database in descending order of the CTRs from an upper group to a lower group according to the advertisement number rate '$N_i$', and storing the arranged advertisements in the advertisement group database; and
an advertisement extraction unit exposing the individual Internet advertisements comprised in the each advertisement group '$G_i$' at a ratio of a frequency of exposure '$A_i$'

$$\frac{C_i \times r^{K_i}}{\sum_{j=1}^{m} C_j \times r^{K_j}} \times \frac{1}{N_i}$$

on an Internet through a web page,
wherein a rate of an advertisement number rate of an upper group '$G_i$' to an exposure frequency setting value of the upper group '$G_i$' "$C_i/N_i$" is greater than a rate of an advertisement number rate of a lower group '$G_{i+1}$' to an exposure frequency setting value of the lower group '$G_{i+1}$' "$C_{1+1}/N_{+1}$", and a correction coefficient '$K_i$' of the upper group '$G_i$' is greater than a correction coefficient '$K_{i+1}$' of the upper group '$G_{i+1}$'.

14. The system of claim 13, wherein the advertisement providing server further comprises an advertisement fee calculation unit applying advertisement fee per click which applies a base rate to an Internet advertisement comprised in a predetermined base group, applies a discount rate to an Internet advertisement comprised in a higher group than the base group, and applies an extra charge rate to an Internet advertisement comprised in a lower group than the base group, when click information is received from the web page providing server.

15. The system of claim 13, wherein:
the advertisement fee calculation unit applies a discount rate which increases as ranking of a group is higher up, and
the advertisement fee calculation unit applies an extra charge rate which increases as ranking of a group is lower down.

16. The system of claim 13, wherein the advertisement group configuration unit places an initial-registered individual Internet advertisement in a predetermined specific group 'Gx'.

17. The system of claim 16, wherein "x=[m/2]" or "x=[(m+1)/2]" is set (where [y] is y when y is an integer, and [y] is a maximum integer less than y when y is not an integer).

18. The system of claim 13, wherein:
the advertisement input unit multiply receives the same advertisement, and
the advertisement pool configuration unit configures an advertisement pool by multiply using the same advertisement.

19. The system of claim 13, wherein:
the advertisement input unit receives a plurality of head copies for the same advertisement, and stores the head copies in the advertisement database, and
the advertisement pool configuration unit processes each of the stored head copies into an individual advertisement.

20. The system of claim 13, wherein:
a 24-hour day is segment into time slots of a certain unit,
the advertisement input unit receives insertion time information for at least one inserted time slot when receiving the individual Internet advertisement, and
the advertisement pool configuration unit configures the advertisement pool with Internet advertisements having insertion time information corresponding to a time slot including a current time.

21. The system of claim 20, wherein the time slot is segmented into six segments of from zero o'clock to four o'clock, from four o'clock to eight o'clock, from eight o'clock to twelve o'clock, from twelve o'clock to sixteen o'clock, from sixteen o'clock to twenty o'clock and from twenty o'clock to twenty-four o'clock.

22. The system of claim 20, wherein when the CTR calculation unit calculates the r value and the advertisement group configuration unit configures an advertisement group,
the CTR calculation unit and the advertisement group configuration unit use a CTR which is calculated during a time slot of the day before, within a certain time from a start point of the time slot, and
after a certain time elapses from the start point of the time slot, the CTR calculation unit and the advertisement group configuration unit use a CTR which is calculated for time from the start point of the time slot to a current time.

23. The system of claim 20, wherein:
the advertisement input unit receives a plurality of head copies, which have different contents according to each time slot for the same advertisement, and insertion time information for a time slot where the head copies are inserted, and stores the received head copies and information, and
the advertisement pool configuration unit configures the advertisement pool with Internet advertisements having insertion time information which corresponds to a time slot including a current time among the stored head copies.

* * * * *